June 6, 1944.   A. D. PENTZ   2,350,810
FLUID DRIVE TRANSMISSION
Filed Dec. 4, 1941   7 Sheets-Sheet 1

INVENTOR:
ALBERT D. PENTZ
Orton and Griswold.
ATTORNEYS.

June 6, 1944.   A. D. PENTZ   2,350,810
FLUID DRIVE TRANSMISSION
Filed Dec. 4, 1941   7 Sheets-Sheet 2

INVENTOR
ALBERT D. PENTZ
BY Orton and Griswold
ATTORNEYS

June 6, 1944.  A. D. PENTZ  2,350,810
FLUID DRIVE TRANSMISSION
Filed Dec. 4, 1941   7 Sheets-Sheet 3

INVENTOR
ALBERT D. PENTZ
BY Orton and Griswold.
ATTORNEYS

June 6, 1944.  A. D. PENTZ  2,350,810
FLUID DRIVE TRANSMISSION
Filed Dec. 4, 1941    7 Sheets-Sheet 4

INVENTOR
ALBERT D. PENTZ
BY
Orton and Griswold.
ATTORNEYS

June 6, 1944.  A. D. PENTZ  2,350,810
FLUID DRIVE TRANSMISSION
Filed Dec. 4, 1941  7 Sheets-Sheet 5

INVENTOR
ALBERT D. PENTZ
BY
Orton and Griswold.
ATTORNEYS

June 6, 1944.  A. D. PENTZ  2,350,810
FLUID DRIVE TRANSMISSION
Filed Dec. 4, 1941  7 Sheets-Sheet 6

INVENTOR
ALBERT D. PENTZ
BY Orton and Griswold
ATTORNEYS

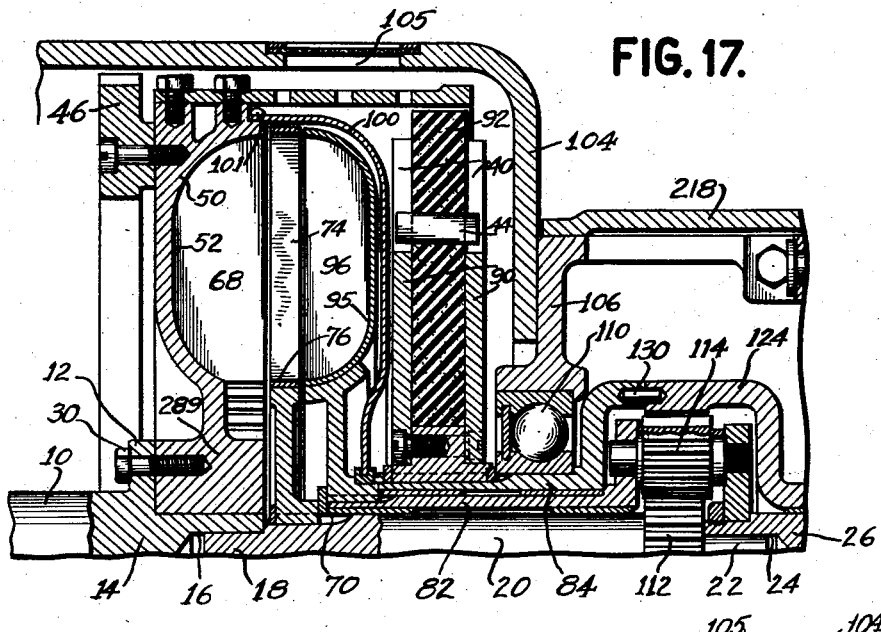
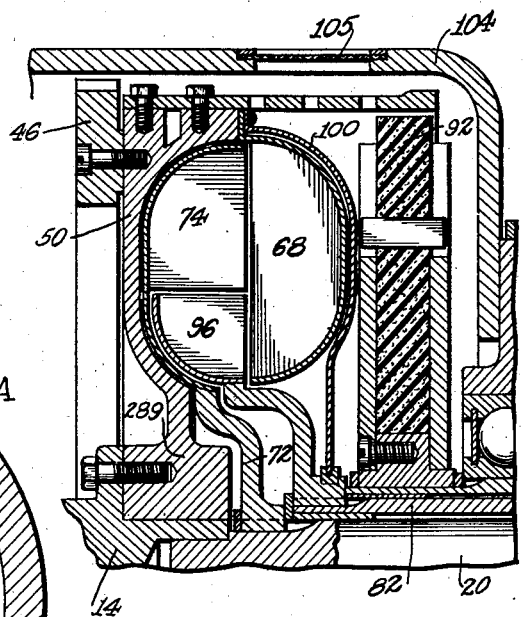
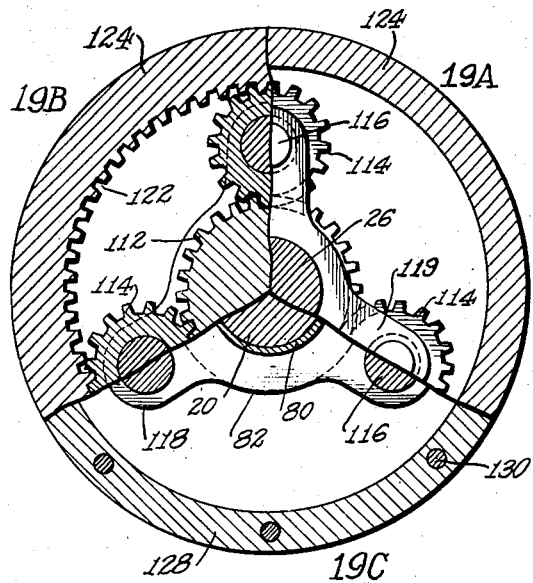

Patented June 6, 1944

2,350,810

UNITED STATES PATENT OFFICE 2,350,810

FLUID DRIVE TRANSMISSION

Albert D. Pentz, New Brighton,
Staten Island, N. Y.

Application December 4, 1941, Serial No. 421,530

34 Claims. (Cl. 74—189.5)

This invention relates to a fluid drive of the kind particularly adapted to motor vehicles although not so limited.

One object of the present invention is a fluid coupling between a prime mover and a propeller shaft.

Another object of the invention is a combined fluid coupling and variable speed planetary transmission.

A further object of the invention is a combined automatic semi-fluid clutch and a speed change transmission for motor propelled vehicles.

Yet another object of the invention is the utilization of a clutch comprising expansible non-metallic material as an element in a variable speed transmission.

The invention also seeks to avoid the excessive slippage between coacting parts of transmissions of the prior art by providing for a true direct drive.

It is also an object of the invention to provide an automatic transmission in which the direction of travel or result desired is manually selected by the operator of the vehicle.

These and other objects of the invention and the means for their attainment will be more apparent from the following detailed description taken in connection with the accompanying drawings illustrating various embodiments by which the invention may be realized and in which:

Figure 17 is a view showing a modification of the fluid drive of Figure 1 wherein the expansible clutch member between the crank shaft and the impeller is omitted and the impeller driven directly by the crank shaft;

Figure 1:
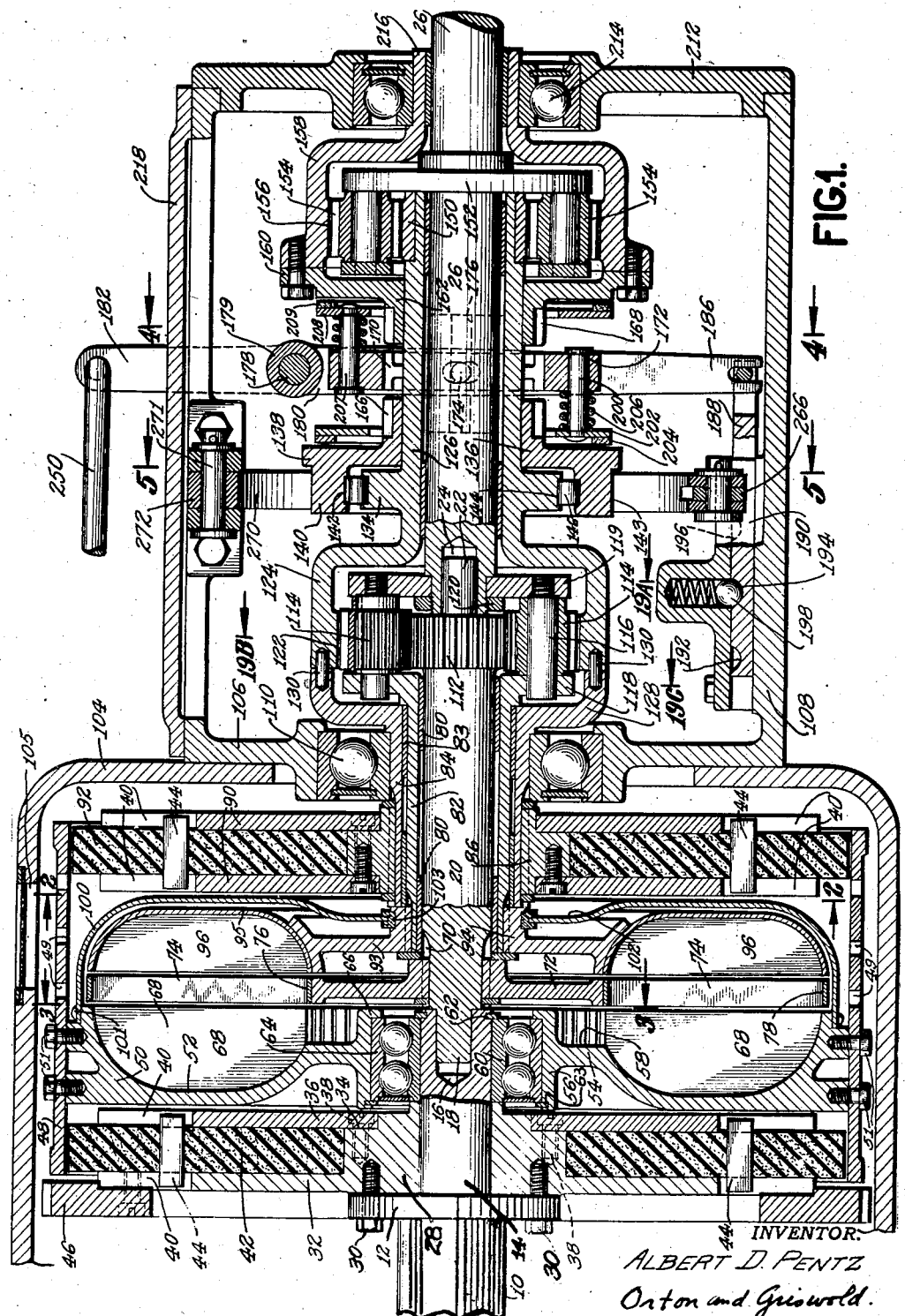
Figure 1 is a view in axial section showing one embodiment of the fluid drive transmission of this invention.

Figure 18 is a view showing a modified form of impeller and impelled members of the fluid drive in which the forces set up by the impelling member may be directly received by both impelled members in one phase of the drive; and Figure 19 is a somewhat schematic view showing the first or governing planetary unit of this invention and its associated parts to illustrate the manner in which the selection of either the high or low speed phase proceeds automatically and without interruptions, the right hand third of the figure showing the parts in the plane 19A, the left hand third being taken in the plane 19B and the lower third being taken in the plane 19C, all looking in the direction of the arrows (Fig. 1).

The fragmentary end of the crank shaft is indicated at 10 and is provided with a flange or collar 12 from which there extends axially a shaft portion 14 of reduced diameter. The reduced portion 14 is recessed axially, as at 16, and receives the reduced cylindrical portion 18 of a continuing but separate shaft portion 20. The shaft portion 20 is similarly provided at its opposite end with a portion 22 of reduced diameter extending into an axial recess 24 of the propeller shaft 26.

Figure 2:
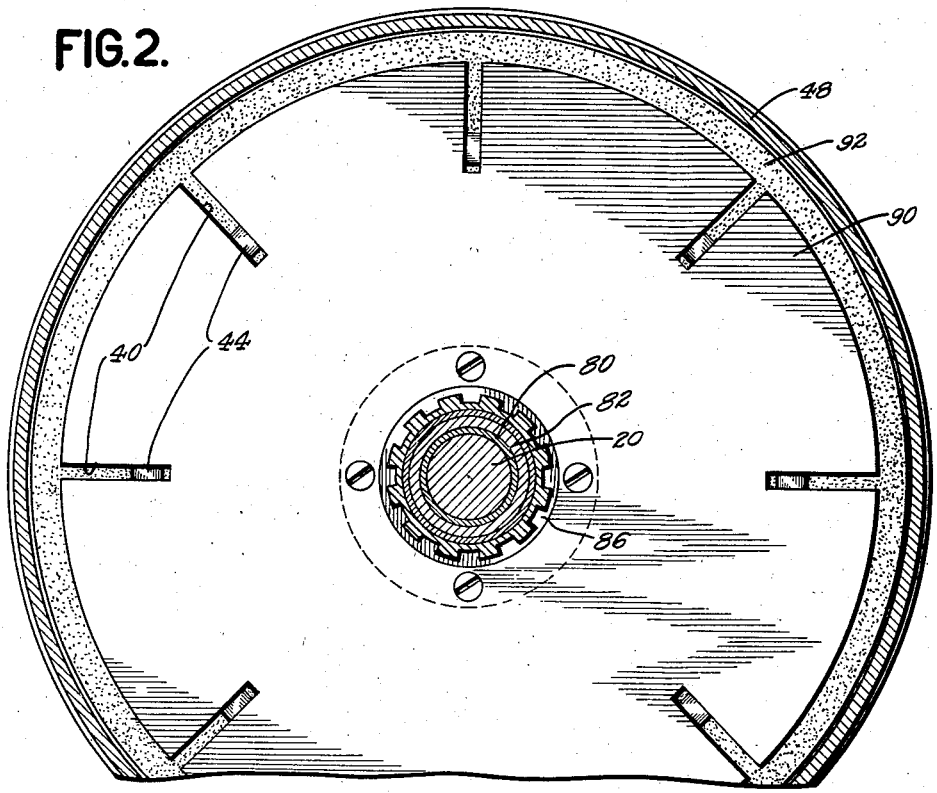
Figure 2 is a transverse vertical view, partly in section, taken in the plane indicated by the line 2—2 of Figure 1 and looking in the direction of the arrows and showing particularly a clutch element radially expansible under centrifugal force.
Figure 16:
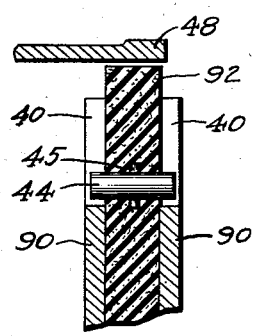
Figure 16 is a transverse sectional view taken in the plane indicated by the line 16—16 of Figure 15 and looking in the direction of the arrows.

Secured to the collar 12 is an annular ring 28 as by the bolts 30. Ring 28 is formed with a disc-like wall 32. On its opposite side ring 28 is concentrically stepped or recessed, as at 34, to receive an annular plate 36 secured to ring 28 in parallel relationship to the disc 32 as by the screws 38. The discs 32 and 36 are provided proximate their outer periphery with registering radially extending slots 40. Between the discs 32 and 36 and substantially confined therebetween, with however provision for radial expansion under the influence of centrifugal force, is a power disc or ring 42 of flowable or expansible and preferably non-metallic material, for instance, rubber, rectangular in cross-section and extending beyond the periphery of the discs 32 and 36. Shown as embedded in the expansible disc 42 are a plurality of driving pins 44, equiangularly disposed about the disc and whereof their extremities protrude from the disc on opposite sides and enter the slots 40 for radial guidance therein. In Figure 2, the pins are shown as flat upon opposite sides while in Figures 13 through 16, the pins are illustrated as cylindrical or round and while round pins are to be preferred in most situations as tending to avoid friction with the walls of the slots, the flattened pins have been used with satisfactory results in some situations. Lugs 45 prevent displacement of the pins (Figure 16).

A starter ring gear 46 is shown as bolted to the disc 32 conveniently in the plane of the flange 12.

When the crank shaft 10 rotates, centrifugal force causes the disc 42 to expand radially and, at a predetermined speed of rotation, engages a drum-like sleeve 48 which encircles the shafts 14 and 20 and rotates coaxially about the shafts. Preferably this drum is ventilated as by apertures 49.

Figure 3:
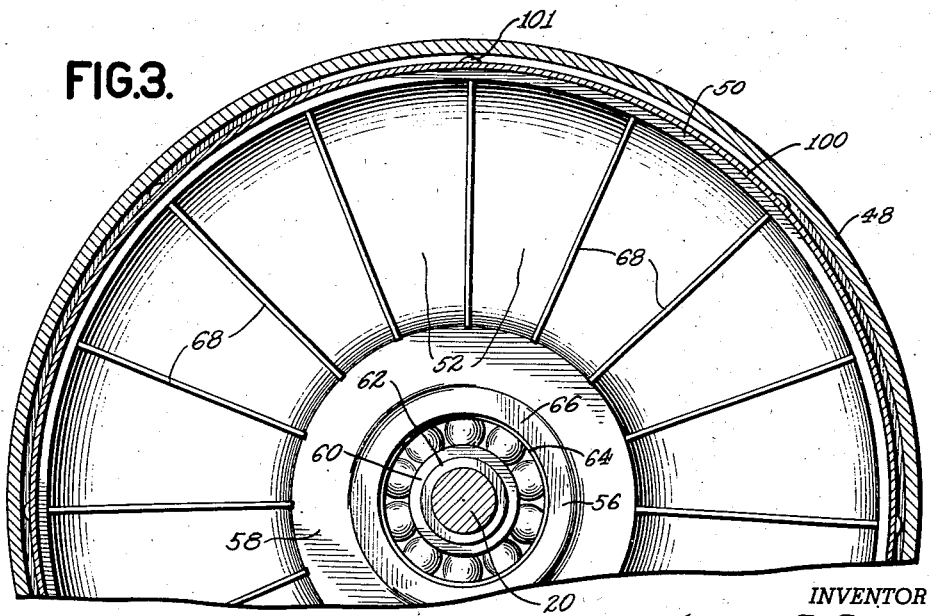
Figure 3 is a transverse sectional view taken in the plane indicated by the line 3—3 of Figure 1 and looking in the direction of the arrows and showing particularly an arrangement of vanes in a fluid propelling member.

Mounted within the drum 48 is a propelling member or fluid impeller member 50 which is removably secured to the drum 48 as by the bolts 51. The member 50 is formed with an annular recess or pan 52 of curvilinear form in the radial direction and carries on its inner periphery a disc-like portion or web 54 on which is mounted, desirably integrally, a cylindrical portion or hub 56. Web 54 and hub 56 define a recessed portion 58 communicating with the pan 52. The member 50 turns about the shaft portion 14, being rotatably supported thereon by anti-friction means such as ball bearings whereof the ball race 60 is held between the snap ring or collar 62, and the hub 28. The cooperating ball race 64 is held between the snap ring 63 and the inturned end 66 of hub 56. Radially extending impeller blades 68 are mounted in the recess portions 52 of the rotating member 50, as shown in Figures 1 and 3.

Mounted on the shaft 20, as by keys 70, is a hub 72 provided on its periphery with radially extending blades 74 conveniently, but not necessarily, corresponding in number and position to the blades 68 of the member 50, the blades 74 being positioned between annular rims 76 and 78 and forming the intermediate runner 72—76. Blades 74 are also spaced axially so as to provide working clearance between driving blades 68 on one side and blades 96 on the opposite side. Proper spacing here prevents the propeller blades from creating undue frictional heat in the liquid contents confined within hydraulic drum casing 50—100 and also predetermines the driving torque slippage between driving and driven members. Surrounding shaft 20 and rotating thereabout, as on the bearing sleeves 80, is a tubular shaft 82. Surrounding shaft 82 and rotating thereabout, as on bearing sleeves 83, is a tubular shaft 84 on which is keyed a collar 86 shown as recessed upon opposite sides to receive annular discs 90, desirably similar to the disc 36. Between the two discs 90 is confined an expansible, yieldable annular disc 92, desirably similar to disc 42, having driving pins 44 guided in radial slots 40 in the discs 90.

Keyed to the hollow shaft 82 is a hub 94 supporting a web 93 on which is mounted an annular pan 95 carrying a plurality of blades 96, desirably similar in form and disposition to the blades 68. A casing 100 is provided, one peripheral edge of which is secured in fluid sealing relation on the member 50, as at 101. The inner circular edge 102 of casing 100 is in sealing contact with the hub 94 by means of a packing member 103. As will be hereinafter more fully described, liquid is confined within the enclosure defined by member 50 and casing 100 as is thus also the impeller 52 and the two impelled members 74 and 96. Suitable seals prevent leakage of fluid into other parts of the mechanism. Any desired means may be provided by which the fluid containing members may be filled with fluid to the desired level, such as a hole tapped, say, in the casing 100 and closed by a removable plug. The level of the liquid determines the efficiency or turning moment delivered by the fluid drive, as will be understood.

The mechanism just described is disposed within a housing 104 which is ventilated as by the screened opening 105. At its forward end, housing 104 is carried by the motor, not shown, and it, in turn, supports the forward end 106 of the transmission case 108 within the hollow shaft 84 rotates on ball bearings 110.

Shaft 20 carries a sun gear 112 meshing with planetary pinions 114 carried on shafts 116, the forward ends of which are mounted in a flange 118 fixed on the rear end of hollow shaft 82. The rear ends of shafts 116 are mounted in a spider 119 shown as fixedly carried on a reduced portion of the shaft 26 and held in position by a threaded collar or nut 120. The internal gear 122 of this planetary gear system is carried by the cylindrical housing portion 124 of a hollow shaft or sleeve 126 rotatably mounted on the shaft 26. The housing 124 is of a diameter equal to a similar portion 128 of hollow shaft 84, and is fixed to such structure by the dowels 130, whereby these two housing portions 124 and 128, with their associated shafts 126 and 84, turn together.

Figure 5:
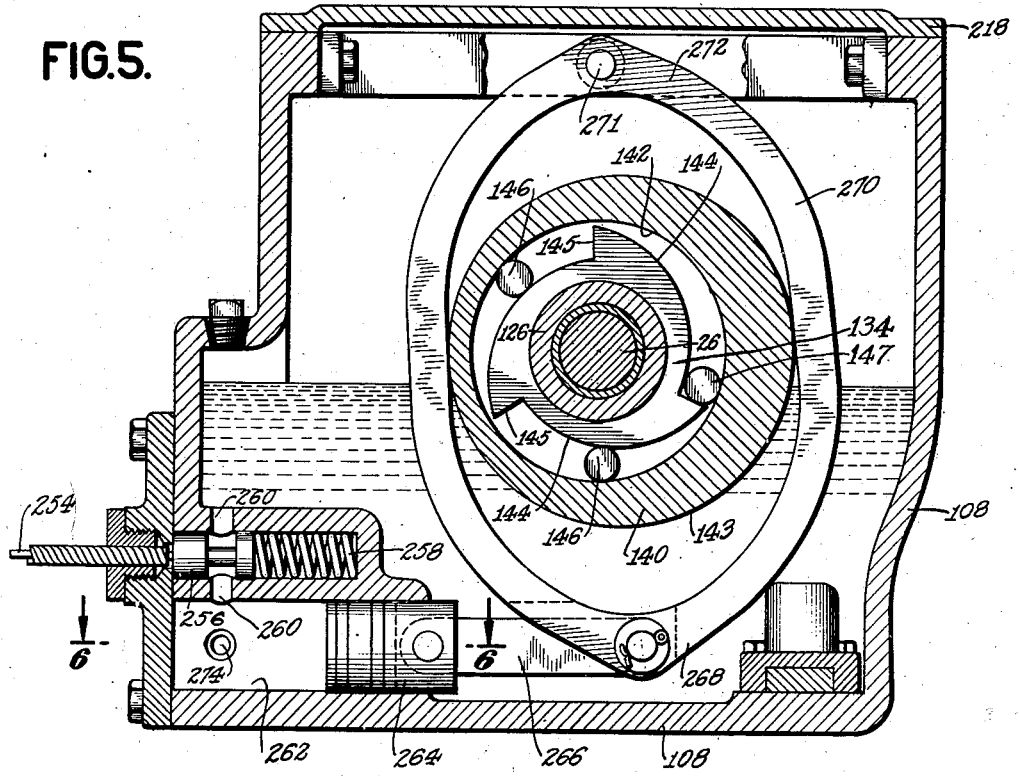
Figure 5 is a view in transverse section taken in the plane indicated by the line 5—5 of Figure 1, looking in the direction of the arrows and showing details of construction.

Preferably integral with hollow shaft 126 (Figures 1 and 5) is the inner member 134 of an overrunning clutch, the outer member of which comprises a sleeve portion 136 rotatably supported on the hollow shaft 126 and formed on the side proximate the clutch member 134 with a flange 138 and an extending clutch member 140 enclosing the inner clutch member 134. The inner surface 142 of the clutch member 140 is concentric to shaft 26, while the outer surface 143 is eccentric thereto. The exterior surface of clutch member 134 is formed in a plurality of cam surfaces 144, say three, progressively increasing in diameter so as to define three radial shoulders 145, 120° apart. Between the surface 142 and the three surfaces 144 are disposed three rollers 146, 147 which, when in one position indicated by roller 147, transmit driving torque from one member to the other and which in the other position, indicated by rollers 146, permit the outer member 140 to overrun the inner member 134, as will be understood. The outer clutch member 136, 140 is adapted to be clutched and declutched from the hollow shaft 126 by a clutching device subsequently to be described. In Figure 5 of the drawings two of the three rollers indicated by the numeral 146 are shown as in engagement while one of the rollers 147 is shown out of engagement. At the moment of "free wheeling" all of the rollers are disengaged so that the transmission leaves its phase of greatest gear reduction or multiple phase and progresses to its simple or 1 to 1 ratio phase in which direct drive, so called, is the objective. Thus, in this transmission, the planetary assembly functions as an overrunning clutch which operates in either direction from a midpoint of the structure.

Hollow shaft 126 also carries the planetary sun gear 150 of the rear or second planetary system. The sun gear 150 meshes with the planetary pinions 154 which are mounted on a spider 152 carried on shaft 26. The internal gear 156 of this planetary system is carried upon a supporting housing portion 158, journalled on the shaft 26, as by the hub 216 and bearing 214, and having suitably secured thereto in its forward side an annular housing member 160 mounted on a sleeve portion 162 integral therewith and corresponding to the sleeve portion 136 of the overrunning clutch member 140.

Both sleeve 136 and 162 are formed with a suitable number of teeth 166—168, on their respective outer surfaces. These teeth 166 and 168 are adapted to be selectively engaged by the internal teeth of a reciprocable annular rack 170 carried by a ring 172 concentric with the shaft 26. When the annular rack 170 is in engagement with the teeth 166, the shaft 26 is connected for movement in one direction of rotation, say a forward direction, for instance, or "motorwise." while when the rack 170 is in engagement with the teeth 168, the shaft 26 is connected to rotate in the opposite direction, say a reverse direction, for instance, or "counter-motorwise." It will be appreciated that the rotation of annular rack 170—172 is prevented as by slidable pin 174 in slot 176 in fixed casing 108. When rack 170 is in engagement wtih either 166 or 168 to prevent the rotation of one or the other of these members in the transmission case, the resultant torque is overcome in casing 108 at slot 176 by the pin 174—172 and annular rack 170—172.

Figure 4:
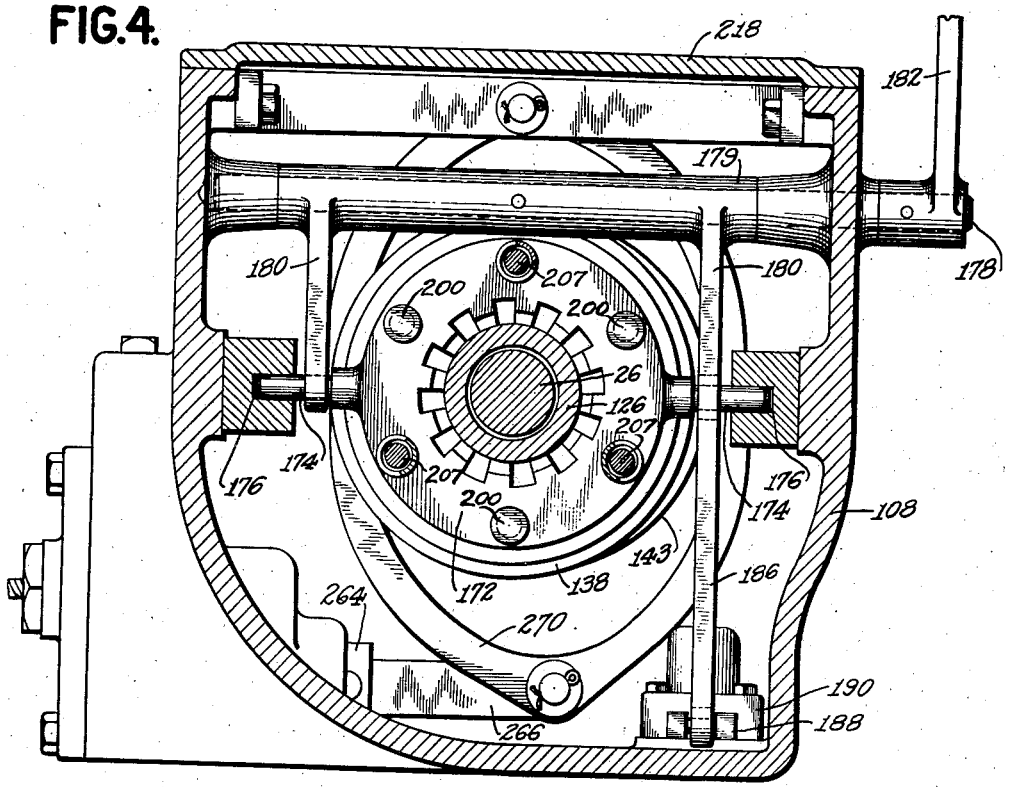
Figure 4 is a transverse sectional view taken in the plane indicated by the line 4—4 of Figure 1 and looking in the direction of the arrows and showing particularly means for stopping rotation of the over-running clutch during a shifting operation.

Upon each side of the ring 172, Figure 4, is a pin 174 slidable in an elongated horizontal slot 176 in the casing 108 and intermediate the transverse plane of the annular racks 166 and 168 and conveniently thereabove is a rock shaft 178 having a sleeve 179 pinned thereon and carrying two arms 180 slotted to receive the pins 174 to reciprocate the ring 172. Shaft 178 has an arm 182 which is operatively connected to manually actuated devices later to be described. An extension 186 on one of the arms 180 is forked and the forked end is engaged with the end of a slide 188 reciprocating within a guide 190 carried by the housing 108. The slide is formed with a plurality of recesses here illustrated as the three recesses 192, 194 and 196, Figure 1, adapted to selectively receive a spring pressed ball latch 198 to retain the slide 188 in any one of three positions, to wit, forward, neutral or reverse position to secure the internal circular rack 170 in the inoperative or neutral position shown in Figure 1, or in either forward position in which the rack 170 is engaged with the teeth 168. To bring either of the rotating sleeves 136 or 162 to a standstill preparatory to engagement of the teeth thereof, the ring 172 carries, on one side an annulus 202 having a clutch facing 204. The annulus 202 is supported on a plurality of pins 206 slidable in the ring 172 and the clutch facing on said annulus is brought into frictional engagement with the overrunning clutch member 140, when the ring 172 is shifted into forward speeds, by springs 206 disposed on the pins between the annulus 202 (Figure 1) and the ring 172. The ring 172 also carries, on the opposite side thereof, a similar annulus 208 supported on another set of slidable pins 207 and urged toward the rotatable housing 160, 158 by similar springs encircling the pins. The clutch facing 209 on annulus 208 is brought into frictional engagement with the housing members 160, 158 when the ring 172 is shifted to the reverse position. The end of casing 108 may be closed by an end member 212 which may also support the shaft 26 on the ball bearings 214 carried in part by the cylindrical extension 216 of the planetary housing 158. A removable cover 218 may also be provided to afford access to the interior.

The operation of the power transmission is best understood by a consideration of Figures 1 and 19. Assume that the engine is turning the crank shaft 10 at a relatively low speed. Shaft 10 in rotating carries with it the rubber power disc 42. Centrifugal force causes this primary power disc 42 to flow or expand radially until it engages the drum 48 which at that time rotates free of engagement with the secondary or direct drive power disc 92. Rotation of the drum 48 carries with it the forward or first or driving member 50, 52 and casing member 100 of the fluid drive coupling, the vanes 68 of which cause the energized fluid therein to tend to rotate motorwise, i. e., in the direction of the crank shaft 10. The energized liquid from impeller vanes 68 impinges on the driven vanes 74 of the intermediate low speed driven member 72 causing the member 72 to rotate motorwise at a speed somewhat slower but closer to that of the member 52. Member 72 being keyed to the shaft 20, rotates that shaft and, of course, also rotates the thereon mounted planetary sun gear 112 motorwise.

Let it be assumed that neutral position of the transmission is desired with motor idling. The lever 182 is in neutral position and the planetary gear housing 124 is free to rotate and, since it is rotating counter-motorwise, no driving force is transmitted to the pinions 114. When the transmission is set in its neutral position, as shown in Figure 1, many other transmission parts are then in reciprocal rotary action and reaction than those discussed up to this point. However, when the transmission is idling in neutral phase, it is first important to note that propeller shaft 26 and its integral parts, i. e., spiders 152 and 119 together with pinion shafts 116 and hollow shaft 82 and driven members 93—95—96 are all fixed against rotation by reason of the fact that propeller shaft 26 is operatively connected, say, to the rear wheels, that is, whenever the vehicle itself is not in motion.

However, at this time of neutral position, almost every other part of the transmission is idling in reciprocal motion. For example, motorwise rotation of sun gear 112 causes each of the planetary gears 114 to separately rotate counter-motorwise on their own axis 116, and this counter-rotation of the planetary gears 114, in turn, cause counter-rotation of internal gear 122 and housing 124 and 128 and hollow shafts 84 and 126 and its sun gear 150.

This reverse rotation of sun gear 150 in neutral position in turn causes pinion gears 154 to rotate motorwise on their own axis and internal gear 156, housing 158 and 160 together with its integrally mounted parts to rotate motorwise as one single unit.

If forward drive is desired, the lever 182 is rotated about its pivot 178 in a clockwise direction as viewed in Figure 1 bringing the brake surface 204 on the pins 200 into yielding engagement with the outer member 138 of the overrunning clutch and bringing that clutch to a standstill. Continued movement of the lever 182 will bring the teeth 170 into engagement with teeth 166 and the transmission into the forward phase, low speed. The tendency, therefore, of the ring gear 122 is to rotate counter-motorwise, this reverse rotation will cause the rollers 146, Figure 5, to lock the coacting surfaces 142 and 144 of the overrunning clutch, thereby retaining the ring gear 122 of the assembly 124, hollow shaft 84 and direct driven members 86, 90, 92 (Figure 1), all of which are, of course, likewise held relatively fixed against rotation by means of pins 174, member 172, housing 108 and slot 176 (Figure 4), that is, against reverse or counter-motorwise rotation. Then rotation of sun gear 112, Figure 1, causes pinions 114 to travel motorwise about the now fixed ring gear 122 carrying with it the spider 119 which is fixed to the shaft 26 thereby causing that shaft to rotate motorwise and thus driving the wheels of the motor vehicle in the forward direction at what corresponds to low speed. At this time, fluid driven member 95, blades 96 and fluid driven member 72, 74 rotate motorwise, but at different velocities, due to the fact that each of these two fluid driven members are geared together by sun gear 112 on shaft 20 and planetary gears 114, on hollow shaft 82 by means of pins 116 and spider 119 on propeller shaft 26. In other words, if the ratio between these two planetary gear members be that of three to one, say, then the planetary sun gear 112, fluid driven members 72, 74 on shaft 20 will rotate three times while the fluid driven members 95, 96 on hollow shaft 82 and the pins 116 rotate but once. Here there is a 3 to 1 ratio both as to velocity and torque.

The power tends to travel through the transmission's lowest geared reduction, for example, as when transmitting power to set a vehicle in motion from a standing start. However, in this instance, it may be considered that planetary geared fluid impelled member 95, 96 is only idling while being carried around. First, member 95, 96 is carried around directly by its planetary pinions 114 (geared at 3 to 1 ratio) meshed with sun gear 112, and, secondly, runner member 95, 96 is likewise carried around indirectly by the propeller shaft 26 as also governed by movement of the vehicle itself, spider 119, pins 116 and planetary gears 114, to and through hollow shaft 82 to fluid member 95—96. The lesser velocity of fluid driven member 95, during the low speed phase, gradually overtakes the greater velocity of its associated fluid driven member 74, through the intermediate or variable speed phases, until both driven members 95 and 74 rotate with like velocities, as when the transmission is in the direct drive phase. True direct drive without fluid slippage is only obtained at times when power disc 92 is engaged with drum 48. Overrunning clutch member 134 is released after the transmission has left its lower speed phases as its other member 148 is fixed in all forward speeds against rotation by shift member 170 at splines 166. As the speed of the engine increases or conversely, the load on shaft 26 decreases, the increased momentum of the energized fluid causes it to impinge on driven blades 96 of the carrying member 95, thereby increasing the rotation of that member in relation to member 74 (in the same motorwise direction as the member 52) up to and at substantially the same speed as blades 74. Since the member 95 and its associated parts is keyed to the hollow shaft 82, substantially a direct drive, with fluid drive slippage, is effected through the shafts 116 of pinion 114 to the spider 119 and thence to the propeller shaft 26. It will be appreciated that free wheeling rollers 146 prevent the ring gear housing 124 from reverse turning whenever the transmission is in its low speed phase but when the hollow shaft 82 is driven at higher velocities by and through the fluid driven means, then the tendency of ring gear housing 124 to turn counter-motorwise is overcome by reason of the combined operation of (1) all the five planetary gears of the front unit and (2) the two driven propeller members of the fluid drive unit and thus the tendency of ring gear 124 is to rotate in the same direction as the other associated shafts. This results in releasing the overrunning clutch member 134. Housing 124 may now turn at the same speed as shaft 20 and as the speed of the member 124 increases, the clutch disc 92 is caused to expand and engage the drum 48 so that at this time a positive direct drive is effected from the crank shaft 10 through the rubber disc 42, drum 48 and rubber disc 92 and the hollow shaft 84 whereby a direct drive on the planetary pinions 114 is effected since it is held fixed between the gears 112 and the ring gear 122 which, at such times, are rotating substantially in unison. This is a semi-fluid direct drive; a true direct drive without slippage corresponds to high speed, as commonly understood. At all times of direct drive, power disc 92 is in driving contact with drum 48. Therefore, propeller shaft 26 and all its associated parts revolve with and at the same velocities as crank shaft 10. In other words, when in direct drive, the entire transmission assembly as a whole rotates with the motor crank shaft velocities as one single unit. Direct drive obtains whenever car travel is above twenty miles per hour. When car travel is less than twenty miles per hour, the transmission comes out of direct drive. At this point, when direct drive is first interrupted power disc 92 must first automatically disengage itself from drum 48, then the transmission itself automatically first operates in variable speeds just below direct drive speeds, or in all those variable intermediate speeds as from a true direct drive down through variable speeds to low speed and vice versa, as from low speed up through all variable speeds to driving contact between disc 92 and drum 48 and then direct drive. This transmission automatically selects the correct reduction gear ratio that may be required at any given moment.

Should the work load on the engine be increased as when the vehicle is ascending a hill in direct drive or when the engine is throttled down, this results in placing an over-load on shaft 26 which slows down spider 118 and therefore pinion pivots 116 are slowed in their travel and expansible disc 92 disengages from drum 98. When this deacceleration occurs, pinions 114 are forced, by the rotation of sun gear 112, to start rotating about both their own pivots as well as about the common axis of the shaft. This immediately tends to stop rotation of ring gear 122 and the member 124 tends to stop and turn in the reverse direction. This reversing tendency locks rollers 146 between free wheeling members 144 and 142 and housing 124 no longer turns and the shaft sleeve 84 and member 92 is no longer turning. Rubber disc 92 having contracted, is not in contact with drum 48 so that now direct drive is automatically interrupted and now the transmission itself automatically tends to operate in all variable speed ranges from direct drive down to so-called low gear. The vehicle is now travelling in terms of "intermediate speed," in a forward direction.

It will be understood that all shifting is best done from neutral position in selecting either the forward or reverse directions and while the vehicle itself is at a standstill with the motor idling.

If reverse drive is desired, first one must shift the transmission to its neutral position if the transmission is idling and in its forward drive phase. At this time, when all the transmission parts are rotating in their neutral phases, assume shaft 26 to be idling, as was described in respect of sleeve 126, and sun gear 150 turning counter-motorwise and causing pinions 154 to rotate motorwise on their own axes and thus ring gear 156 together with its integral member parts 158, 160, 162 and teeth 168 to also rotate motorwise. Of course, propeller shaft 26 and its parts are held relatively fixed against rotation by their connection to the rear wheels. Assume, now, that the lever 182 is rotated about its pivot 178, Figure 1, counter-clockwise to cause brake shoe 209 to engage and stop rotation of member 160 and its associated parts. Then the teeth 170 of the slidable sleeve 172 are shifted into engagement with the teeth 168 of reversing gear member 162, 160. Thus the ring gear 156 is held stationary against rotation while the planetary sun gear 150 continues rotating counter-motorwise, and thus causes the planetary pinions 154 to rotate and to travel about the locked ring gear 156 in the same direction as the counter-motorwise rotation of the sun gear 150. Thus pinions 154 carried on the spider 152 move in the opposite direction to thereby cause the propeller shaft 26, in turn, to rotate in the same counter-motorwise direction, which is a direction the reverse of that heretofore described. Thus, in a motor vehicle, the wheels are propelled in the opposite direction and the direction of travel of the vehicle is thereby in reverse. When shifting, that is, selecting the direction of the vehicle, the motor must be idling and the vehicle at a standstill. The overrunning clutch is first braked by rocker yoke 270 later to be described. When yoke 270 is employed as a brake, then, driven parts of the transmission unit are fixed against rotation. At this point substantially all slippage is transferred back to the liquid contents of the hydraulic coupling 52—68—100 and the now non-rotating driven members 74—95—96, although the idling rotation of driving members 52—68 has not been interrupted due to slippage.

Figure 9:
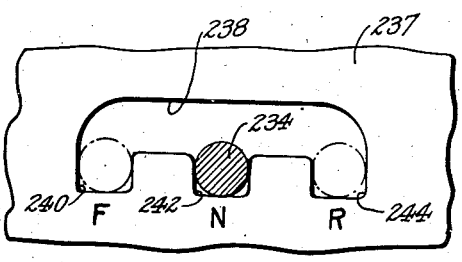
Figure 9 is a fragmentary view showing, in outside elevation, the positions of the control lever, looking in the direction of the arrows 9—9 in Figure 8.
Figure 8:
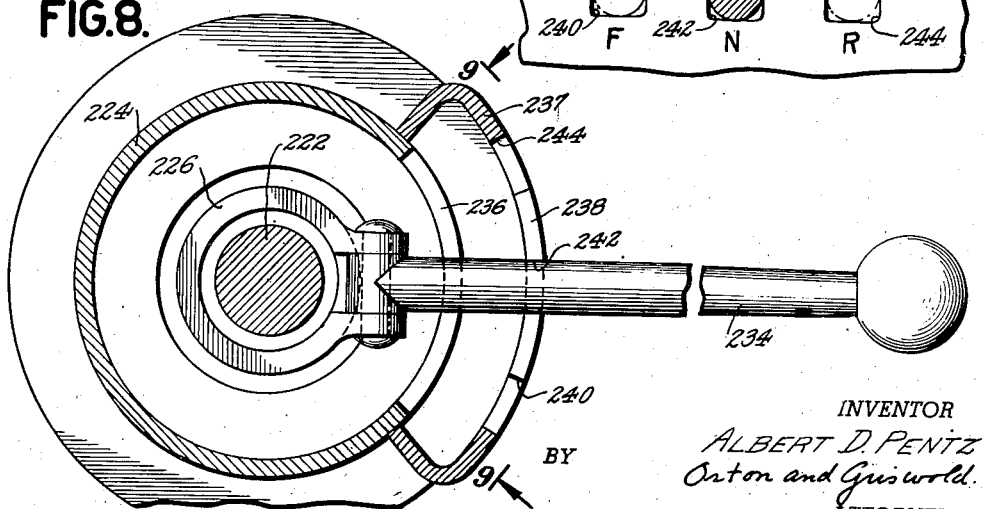
Figure 8 is a transverse sectional view taken in the plane indicated by the line 8—8 of Figure 7 and looking in the direction of the arrows.
Figure 7:
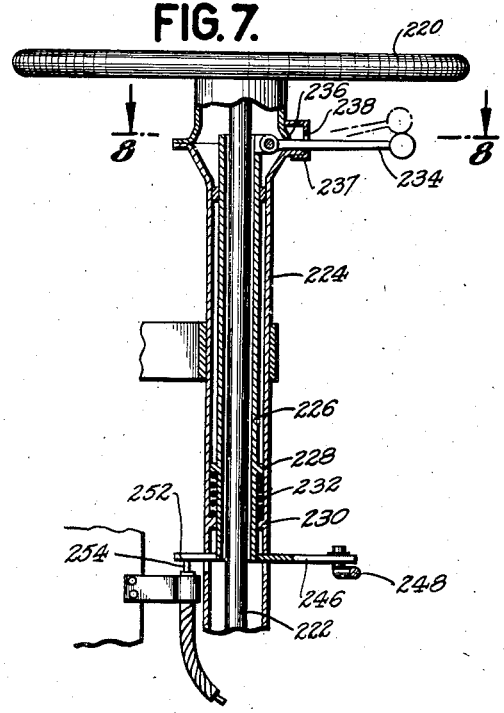
Figure 7 is a view showing the controlling devices for the transmission of this invention at the steering wheel of a motor vehicle.

Assuming the apparatus of this invention to be used as the variable driving instrumentality of a vehicle, the arm 182 and its associated elements is conveniently acutated from a point proximate the steering wheel. Referring to Figures 7, 8 and 9, a steering wheel is indicated at 220 mounted on the shaft 222 enclosed within the steering column 224. Within the steering column 224 is a rotatable sleeve 226 supported for axial movement also. To this end, the lower portion of sleeve 226 is formed with a shoulder 228 in spaced relation to a shoulder 230 on the column 224. An elastic device such as a coil spring 232 is mounted between the shoulders 228 and 230.

On the upper end of the sleeve 226 is pivotally mounted a hand lever 234 which extends through a circumferential slot 236 in the steering column. The hand lever 234 is fulcrumed in this slot for movement in a vertical plane as viewed in Figure 7 and movable in the slot to rotate the sleeve 226 about the axis of the shaft 222. A housing 237 carried outwardly of the slot 236 is formed with a passage 238 for the hand lever, the lower edge of which is formed with notches, illustrated as three in number and indicated at 240, 242 and 244. The intermediate notch 242 receives hand lever 234 in neutral position of the annular rack 170. The notch 240 receives the lever 234 in, say, forward position of rack 170 and notch 244 receives the lever in so-called reverse position of rack 170.

To actuate the rack 170 from the hand lever 234, the sleeve 226 carries, conveniently at its lower end, an arm 246 connected through shiftable instrumentalities such as indicated at 248 to the link 250 connected to the arm 182, Figure 1.

It is also desirable to hold the outer member of the overrunning clutch stationary every time the hand lever 234 is operated in order to shift the rack 170 in or out of engagement with the teeth. In the illustrated embodiment, axial movement of the sleeve 226 is utilized to apply braking pressure to the overrunning clutch. Because the hand lever 234 is fulcrumed in slot 236, whenever the lever is raised out of a notch and during its movement from one notch to another, the sleeve 226 is moved downwardly against the pressure of the restoring spring 232. As illustrated, the sleeve, or an arm 252 thereon, actuates a Bowden wire 254 which reciprocates a slide valve 256, normally pressed to open position by a spring 258. This slide 256 controls a port 260 in a chamber or cylinder 262 in which a piston 264 reciprocates. The piston is connected by a link 266 to one end 268 of a yoke 270 pivoted as at 271 at its opposite end 272 on the casing 108. The yoke 270 embraces the eccentric surface 143 of the overrunning clutch member 140. Therefore, as the clutch member 140 rotates, the free end of the yoke reciprocates and thereby causes the piston to constantly reciprocate. The cylinder 262 communicates also with the interior of the casing 108 through a check valve 274. It will be understood that the casing is partly filled with lubricating oil. The check valve permits oil to enter the cylinder but not to escape therefrom. Whenever movement of rocker yoke 270 is stopped, this causes all the driven parts of the transmission to be stopped also. At this time, due to fluid slippage between idling impeller and runners, the runners stop. Rocker yoke 270 and cam member 140 and their associated parts are in operation only at such times as the transmission is set for either neutral phase or reverse phase. Whenever the transmission is set in its forward phase, cam 140 and yoke 270 are held fixed and out of operation by shift member 172, meshing with teeth 166 and therefore, this yoke assembly unit cannot function again until the transmission is shifted from neutral either to its forward or reverse phases. That is, cam 140 can only rotate when transmission is in neutral and reverse. Therefore, cam 140 and yoke 270 and piston 264 do not function whenever the transmission is in any one of its forward phases.

Figure 6:
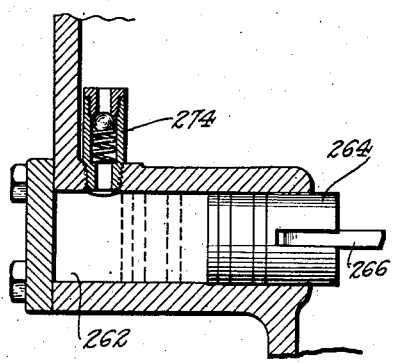
Figure 6 is a fragmentary view taken in the plane indicated by the line 6—6 of Figure 5 and looking in the direction of the arrows.

At all times that the overrunning clutch is turning, the piston 264 reciprocates and oil is drawn in and forced out of the port 260. When, however, the hand lever 234 is raised at the inception of a shifting operation, the port 260 is closed, trapping the oil in the cylinder and thereby applying braking force to piston 264, link 266, yoke 270, cam 143 and to the overrunning clutch member 140, 142 to thus hold the other member parts of the transmission stationary, while shifting member 172 into non-rotary engagement with either teeth 166 or teeth 168, as the case may be. In some situations, the piston 264 may be in the dotted line position (Figure 6) with the cylinder empty or partly empty of oil. No braking action would therefore take place and provision is therefore made to draw in oil through the check valve 274 until the cylinder is full of oil and therefore reciprocation of the yoke and its associated parts prevented.

Figure 10:
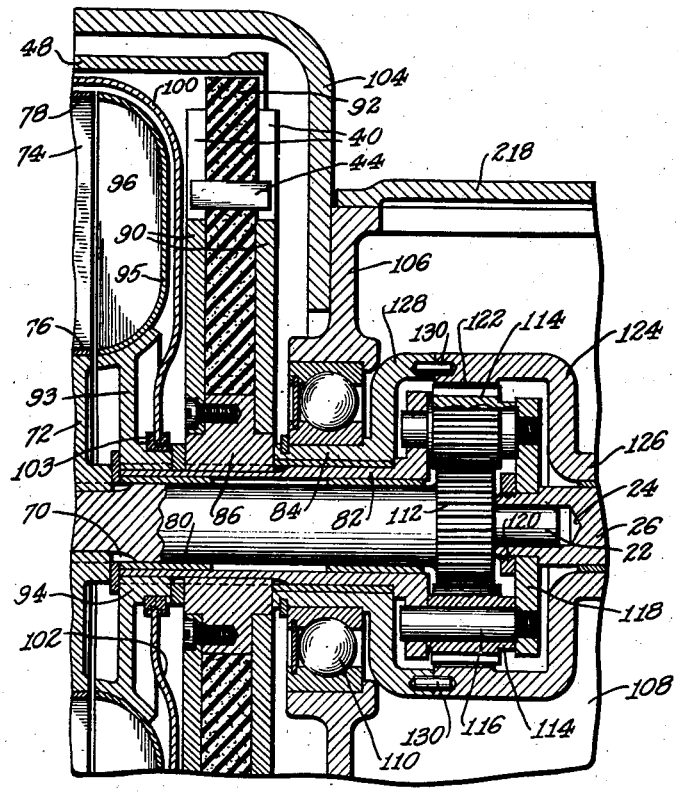
Figure 10 is a fragmentary view in longitudinal section showing a modification of the invention.

In Figure 10 there is illustrated a simplification of the high speed direct drive through the rubber disc 92. Similar parts in Figures 1 and 10 have the same reference characters affixed thereto. The hub 86 of the rubber disc 92 is splined to hollow shaft 82 instead of to the shaft 84 and thereby decreases its leverage or turning moment. When the shaft 82 is rotated by the combined fluid action of the planetary geared vanes 74, 96, the rubber disc 92 expands radially into engagement with the drum 48 and drives the vehicle in "high speed." In the previously described modification, the hub 86 was splined to the ring gear housing 128 which was caused to rotate through the entire planetary gearing to obtain the desired effect. This assembly rotates counter-motorwise with very low velocities. Disc 92 never expands so as to engage drum 48 when in reverse phase, upon reverse motion of the vehicle itself.

However, should the car get out of control and roll backwards down-hill at a speed of more than twenty miles per hour, then disc 92 would expand and engage with drum 48. Such engagement therefore would serve in this emergency as a safety brake which would tend to stop the vehicle itself and thus avert possible disaster.

Figure 11:
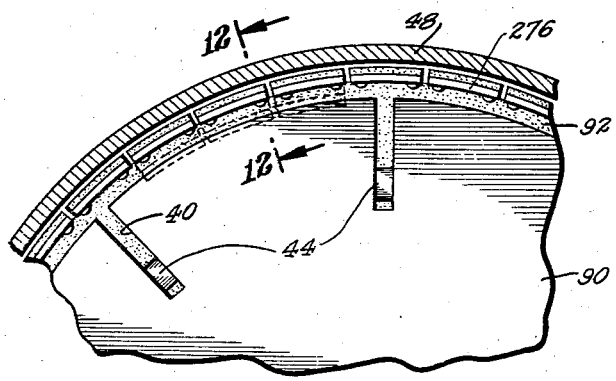
Figure 11 is a fragmentary view showing a modification of the invention illustrated in Figure 2.
Figure 12:
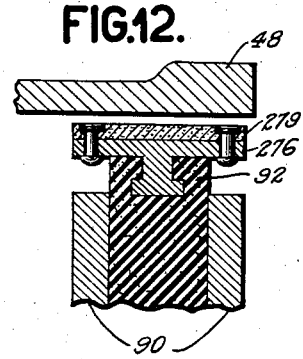
Figure 12 is a fragmentary transverse sectional view taken in the plane indicated by the line 12—12 of Figure 11 and looking in the direction of the arrows.

In some situations, referring to Figures 11 and 12, it has been found that the rubber of the discs 92 and 42 adheres to the drum 48 so that a coating of particles from the discs builds up on the drum 48. When a disc expands into contact with the rubber coated metal surface it seizes to the rubber coating on the drum 48. This results in a too rapid engagement of the discs to the metal and a smooth operation is not always obtained. To obviate this difficulty, the periphery of the discs 42 and 82 may be provided with a friction surface not contributing to this seizing. In the illustrated embodiment, a plurality of T-shaped metal segments 276 are carried on the periphery of the disc slightly spaced circumferentially of each other. The segments 276 are conveniently provided with facing material 279 which will not have this deleterious frictional effect. In the preferred embodiment, a fibrous material, such as molded asbestos brake lining 279 is used which is riveted to the segments, as at 280. Thus arranged, a desired degree of slippage is provided between a power disc and the drum so that when these members either engage or disengage, they slip and thus overcome possible velocity differential between the members before they lock together and before they unlock from true direct drive.

In any of the modifications, the power discs may, in some situations, expand or flow in more than one direction. For instance, the disc may first expand radially and engage the drum 48, and then, under increased centrifugal force, the power discs may also expand laterally or flow sidewise against the walls 32 and 36, the latter action taking place after the outer circumference of a disc is fixedly engaged with the drum 48. They thus aid the drive pins 44 in the transmission of torque.

Figure 13:
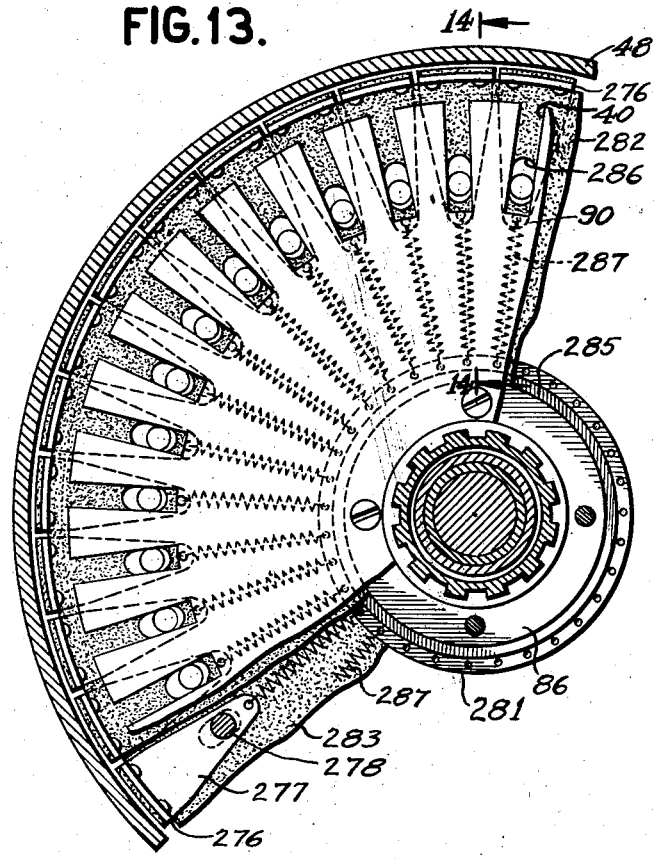
Figure 13 is a fragmentary view showing a modified form of the clutch of Figure 2 and having means to control its movement into engaged position.
Figure 14:
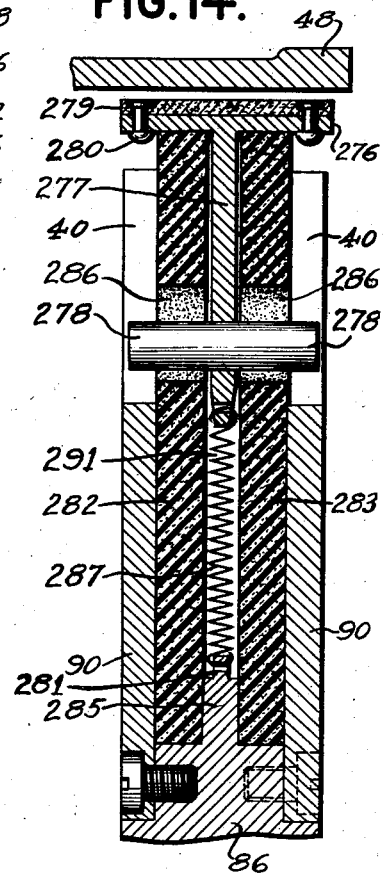
Figure 14 is a radial sectional view of the clutch of Figure 13 taken in the plane indicated by the line 14—14 of Figure 13, looking in the direction of the arrows.
Figure 15:
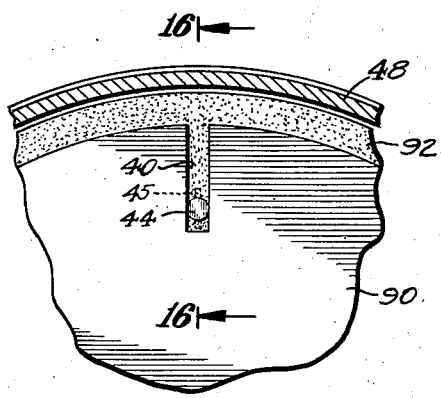
Figure 15 is a fragmentary view showing a modified form of the driving pins of Figure 2.

In some situations it has been found that the centrifugal force acting on the expansible rubber drive or driven discs, such as those indicated at 42 and 92 in Figure 1, will cause a disc to expand only sufficiently to contact slightly with the coacting part, or momentarily frictionally and drivingly engage therewith, as centrifugal force or the expansion of the rubber is not sufficiently rapid at the moment to maintain a disc firmly in driving or driven engagement, as the case may be. A "chattering" of the coacting parts results. To prevent this insufficient engagement of the periphery of a disc with its coacting part, means may be provided to restrain the engagement of the disc until a predetermined centrifugal force is attained. In Figures 13 and 14, wherein like reference characters are affixed to corresponding parts, wherever appropriate, the hub 86 supports the discs 90, as before. The disc of expansible material, however, is composite and comprised of two members 282, 283 supported on the hub 86 but separated by a flange 285 on the hub. At their outer periphery, the discs carry the T-shaped segments 276 provided with radially extending shanks 277 which extend toward the hub 86 and terminate in laterally extending arms 278 corresponding, in a sense, to the pins 44 and passing through slots 286 in the rubber discs 282, 283 and slots 46 in the wall members or discs 90. Tension means 287 in the space 291 between the discs extend between the hub 86 and the shank tending to draw the segments 276 toward the axis of the hub 86. These tension devices are so designed as to regulate or overcome centrifugal forces either more or less than that required to cause the segments 276, 279 to move radially sufficiently to firmly and drivingly engage, say, the drum 48. The segments are thus held away from the drum until the speed of rotation of the hub is sufficient to overcome the tension of the springs. By the time the segments are in driving engagement with the drum 48, the rubber discs 282, 283 will have expanded sufficiently to engage the segments to maintain the segments in driving engagement. In the illustrated embodiment, a plurality of radially disposed springs 287, of suitable tension, extend between arms 277 on the respective segments and the lugs 281 on the flange 285 on the hub. Obviously, the two disc sections 282, 283 might be replaced by a unitary disc formed with radial passages to receive the springs.

In some situations, also, it may be found desirable to dispense with the first expansible disc 42 (Figure 1) and drive the impeller 50, 52 and the member 100 directly from the drive shaft 10. A fragmentary part of the fluid drive transmission according to this modification is illustrated in Figure 17 wherein like reference characters are affixed to corresponding parts.

In this modification, the impeller 52 is carried on a hub 289 secured directly on the shaft section 14 by the bolts 30 so as to rotate therewith immediately instead of remaining stationary until picked up by the first power disc 42 under the influence of centrifugal force. From this point on the drive is the same as that previously described.

In the alternative modification of the invention of Figure 18, wherein like parts are indicated by similar reference characters, the impeller member 68 is adapted to distribute its torque selectively to the impelled runner members 74 and 96. Thus, with low torque velocities, when idling, the liquid, in large measure at least, is in engagement nearest the axis of the device, whereas the air bubble, or airage, at this time, is distributed about the periphery of the device. Therefore, the low velocity torque is applied primarily to the direct drive blades 96. This tends to prevent the vehicle creeping when halted in traffic. As the velocities are increased, the air moves inwardly toward the axis, being displaced by the liquid which moves outwardly to engagement with the outer portions of both driving and driven blades, to the end that both the impelled members 74 and 96 lie full length within the driving torque engagement from impeller member 68. Thus, in low speeds, the lesser driving torque is applied to impelled member 96 and the greater driving torque is applied to driven member 74, and a greater initial torque or turning moment on shaft 20 results. A fast pick-up as from a standing start, is one of the many advantages with this fluid drive arrangement.

In Figure 19 is shown a somewhat schematic view showing the first or governing planetary unit of this invention and its associated parts to illustrate the manner in which the first or governing differential functions as a universally automatic, velocity governed, variable speed power transmitter to illustrate the manner in which the selection of either the high or low speed phase proceeds automatically and without interruptions. This device depends solely upon the relative velocities created by the reciprocal rotary motion of its own member parts, i. e., R. P. M. velocities of the power driving members and the R. P. M. velocities of driven members, as in the miles per hour of the vehicle itself, and the R. P. M. of power motor.

This transmission is fully self-automatic, particularly because of the fact that relative velocities alone govern or self-determine all changes in gearing differentials as required at any given moment. This automatic transmission therefore, performs its function of propelling the vehicle forward in an improved manner different from that of the transmissions of the prior art. Only one planetary unit is employed for all forward speed ranges, as this one unit automatically controls or self-determines the exact radial degree of leverage or driving torque needed at any given moment or as may be required in passing, say, from a low speed phase to a direct drive phase and vice versa. Thus natural forces, such as relative velocities, are adapted to govern and are employed to control every speed phase in the leverage magnitude of the driving torque automatically created and applied at any given moment, and, at the same time, to govern to or from, as the case may be, either a low or a high gear ratio phase as automatically controlled by and within the single planetary unit assembly. Thus the application of driving torque may, at all times, be smooth and continuous and is never abruptly uninterrupted so as to cause the vehicle or motor to "buck." In the prior art, a plurality of planetary transmission units in conjunction with complicated automatic producing systems are required to transmit driving torque in changing from the low speed ranges to the high speed phases. There is thus an interruption and irregularity in the transmission of the forces by reason of the necessity of changing the flow of power from one unit to flow through another unit due to the relative velocity difference between driving and driven members, or in the differences in the gear reduction ratios of the respective planetary units. A true direct drive is never attained in the prior art because more or less hydraulic slippage is always present in the fluid coupling.

Also, in contra-distinction to prior art transmissions and as an improvement thereover, the transmission of this invention provides two separate and distinct phases of so-called direct drives, i. e., (1) a fluid direct drive, and (2) a semi-fluid direct drive. (1) One direct drive with slippage in fluid coupling and (2) another semi-fluid or rubber cushioned direct drive with no slippage. In the first situation when the direct drive is transmitted solely through the liquid itself as energized from the impeller to the impelled members, here, of course, there is some fluid slippage between the driving and driven hydraulic coupling members. In the second situation, however, there is no slippage, because semi-fluid rubber power disc 92 is in fixed driving contact with drum 48. This arrangement, therefore, results in a true direct drive as there is no slippage between co-acting parts and, furthermore, in this latter situation, a semi-fluid or rubber cushioned direct drive is effected inasmuch as an elastic rubber power disc 92 is a semi-fluid power disc. A true direct drive is effected in which the driving force is not directly or positively connected from motor to rear wheels, but is effected with a cushioning or yielding effect of semi-fluid rubber disc 92 in driving contact with drum 48.

The drive is also more effective because the direct drive propelled member 95 is directly and positively operatively connected with the rear or propelling wheels of the vehicle by continuous shafting.

It will thus be seen that the vehicle drive of this invention is a combined fluid drive automatic variable speed power transmission. This dual transmission as a whole is used either as a simple or compound machine, with single or multiple torque. Both driving and driven member parts are so disposed as to rotate reciprocally either independently or collectively. The fluid drive impeller, being fixed on the motor crank shaft, is rotated therewith and when in operation, rotates the driven member parts. When released, the driving and driven structures act independently as with variable or mixed velocities of three to one, producing multiple turning moments. Thus the device functions as a compound machine but when locked together, by members 82 and 48, all the driving and driven parts rotate collectively as one single unit with like velocities and produce a single turning moment or torque, as with ratios of one to one, and thus the device functions as a simple machine. Therefore, the wholly automatic features of this device are inherent in and natural to the self-created velocities of the device itself.

It will further be seen that a self-actuated combined fluid drive and automatic variable speed transmission has been provided having relatively few parts and which is inherently independent of auxiliary control devices operated either electrically or hydraulically or by vacuum which, in the prior art, complicates the construction and operation of the apparatus and increases the weight of the vehicle and the cost of manufacture.

Various modifications will occur to those skilled in the art in the composition, configuration and disposition of the component elements going to make up the invention as a whole as well as in the selection and utilization of particular portions and combinations thereof for particular purposes and no limitation is intended by the phraseology of the foregoing description or illustrations in the accompanying drawings except as indicated in the appended claims.

What is claimed is:

1. In a power transmission, a driving shaft, an impeller, means for securing said impeller to said shaft for rotation therewith, a drum carried by said impeller, an intermediary shaft coaxially aligned with said driving shaft, a flanged sleeve on said intermediary shaft, an impelled member carried by said sleeve, a runner intermediate said impeller and said impelled member carried by said intermediary shaft and driven by said impeller, a planetary gear assembly having a sun gear mounted on said intermediary shaft for rotation therewith, a driven shaft in prolongation of said driving and said intermediary shafts, a spider carried by said driven shaft, pinions in mesh with said sun gear pivoted in said spider and in the flange of said flanged sleeve, a hollow shaft coaxial with said driven shaft having a portion of extended diameter for housing said gear assembly, an internal ring gear secured to said hollow shaft within said extended portion in mesh with said pinions, a radially expansible member responsive to centrifugal forces created by the rotation of said driven shaft carried by said hollow shaft and engageable with said drum, an over-running clutch having an outer member and a cooperating inner member, said inner member being secured to said hollow shaft for rotation therewith, a sun gear carried by said hollow shaft, pinions carried by said driven shaft in mesh with the last mentioned sun gear, a housing rotatably mounted on said driven shaft, an internal ring gear on said housing in mesh with said last mentioned pinions, and means for selectively holding said outer clutch member or said last mentioned ring gear against rotation.

2. In a power transmission, a driving shaft, an impeller, means for securing said impeller to said shaft for rotation therewith, a drum carried by said impeller, an intermediary shaft coaxially aligned with said driving shaft, a flanged sleeve on said intermediary shaft, an impelled member carried by said sleeve, a runner intermediate said impeller and said impelled member carried by said intermediary shaft and driven by said impeller, a planetary gear assembly having a sun gear mounted on said intermediary shaft for rotation therewith, a driven shaft in prolongation of said driving and said intermediary shafts, a spider carried by said driven shaft, pinions in mesh with said sun gear pivoted in said spider and in the flange of said flanged sleeve, a hollow shaft coaxial with said driven shaft having a portion of extended diameter for housing said gear assembly, an internal ring gear secured to said hollow shaft within said extended portion in mesh with said pinions, a radially expansible member, responsive to centrifugal forces created by the rotation of said driven shaft, carried by said flanged sleeve and engageable with said drum, an over-running clutch having an outer member and a cooperating inner member, said inner member being secured to said hollow shaft for rotation therewith, a sun gear carried by said hollow shaft, pinions carried by said driven shaft in mesh with said last mentioned sun gear, a housing rotatably mounted on said driven shaft, an internal ring gear on said housing in mesh with said last mentioned pinions, and means for selectively holding said outer clutch member or said last mentioned ring gear against rotation.

3. A mechanism according to claim 2, wherein the means for securing the impeller to the driving shaft comprises a radially expansible member secured to said shaft for rotation therewith and engageable by the drum in response to centrifugal forces created by the rotation of the driving shaft.

4. In a power transmission, a driving shaft, a driven shaft, and an intermediary shaft, a liquid coupling between said driving shaft and said driven and intermediary shafts, a reduction gear assembly connecting said intermediary and said driven shafts, a one way over-running clutch having two cooperating members, one of said clutch members being operatively connected with one of the gears of said gear assembly, means for releasably holding the other one of said clutch members against rotation, wedging means automatically locking said clutch members together, thereby effecting a torque multiplying transmission through said gear assembly, when the driving torque is insufficient to overcome the load on said driven shaft, and automatically unlocking said clutch members, thereby effecting a slippage allowing direct transmission through said liquid coupling, when the driving torque and the load torque are substantially equalized.

5. In a power transmission, a driving shaft, a driven shaft, and an intermediary shaft, a liquid coupling between said driving shaft and said driven and intermediate shafts, a planetary gear assembly connecting said intermediary and said driven shafts, a ring gear forming a part of said gear assembly, a one way over-running clutch having two cooperating members, one of said clutch members being secured to said ring gear for rotation therewith, means for releasably holding the other one of said clutch members against rotation, wedging means automatically locking said clutch members together, thereby effecting a torque multiplying transmission through said gear assembly, when the driving torque is insufficient to overcome the load on said driven shaft, and automatically unlocking said clutch members, thereby effecting a slippage allowing direct transmission through said liquid coupling, when the driving torque and the load torque are substantially equalized.

6. In a power transmission, a driving shaft, a driven shaft, and an intermediary shaft, a liquid coupling between said driving and said driven and intermediary shafts, a reduction gear assembly connecting said intermediary and said driven shafts, a one way over-running clutch having two cooperating members, one of said clutch members being operatively connected with one of the gears of said gear assembly, means for releasably holding the other one of said clutch members against rotation, wedging means automatically locking said clutch members together, thereby effecting a torque multiplying transmission through said gear assembly, when the driving torque is insufficient to overcome the load on said driven shaft, and automatically unlocking said clutch members, thereby effecting a slippage allowing direct transmission through said liquid coupling, when the driving torque and the load torque are substantially equalized, and means responsive to centrifugal forces created by the rotation of said driven shaft, made operative when said rotation attains a predetermined speed, for effecting a direct transmission without slippage.

7. In a power transmission, a driving shaft, a driven shaft, and an intermediary shaft, a liquid coupling between said driving shaft and said driven and intermediary shafts, a planetary gear assembly connecting said intermediary and said driven shafts, including a ring gear, a one way over-running clutch having two cooperating members, one of said clutch members being secured to said ring gear for rotation therewith, means for releasably holding the other one of said clutch members against rotation, wedging means automatically locking said clutch members together, thereby effecting a torque multiplying transmission through said gear assembly, when the driving torque is insufficient to overcome the load on said driven shaft, and automatically unlocking said clutch members, thereby effecting a slippage allowing direct transmission through said liquid coupling, when the driving torque and the load torque are substantially equalized, and means responsive to centrifugal forces created by the rotation of said driven shaft, made operative when said rotation attains a predetermined speed, for effecting a direct transmission without slippage.

8. A mechanism according to claim 7, wherein the three shafts are coaxially aligned, and the last mentioned means consists in locking the driving shaft and the driven shaft together.

9. In a power transmission, a driving shaft, a driven shaft, and an intermediary shaft, a liquid coupling between said driving shaft and said driven and intermediary shafts, a planetary gear assembly connecting said intermediary and said driven shafts, including a ring gear, means for holding said ring gear against rotation in one direction, thereby effecting a torque multiplying transmission through said gear assembly, said means being operable to release said ring gear for rotation in either direction, thereby effecting a slippage allowing direct transmission through said liquid coupling, and a clutch subject to the action of centrifugal forces created by the rotation of said driven shaft, made operative when said rotation attains a predetermined speed, for by-passing said liquid coupling and effecting a direct transmission without slippage.

10. A mechanism according to claim 9, wherein the three shafts are coaxially aligned, and the clutch operates to lock the driven shaft to the driving shaft.

11. A mechanism according to claim 9, wherein the clutch comprises a drum, means locking said drum to the driving shaft for rotation therewith, and a radially expansible member operatively associated with the driven shaft for frictionally engaging said drum.

12. A mechanism according to claim 9, wherein the clutch comprises a drum, means locking said drum to the driving shaft for rotation therewith, and a rubber disc operatively associated with the driven shaft for frictional engagement with said drum.

13. A mechanism according to claim 9, wherein the liquid coupling comprises an impeller operatively connected with the driving shaft, an impelled member operatively connected with the driven shaft, and a runner intermediate said impeller and said impelled member, operatively connected with said intermediary shaft.

14. In a power transmission, a driving shaft, a driven shaft, means for transmitting power from said driving shaft to said driven shaft, including a centrifugal clutch, a liquid coupling, and a reduction gear assembly, means, interconnecting said liquid coupling and said reduction gear assembly for automatically engaging said reduction gear assembly in the transmission to effect torque multiplication when the driving torque is insufficient to overcome the load on said driven shaft and for automatically establishing a slippage allowing direct transmission between said shafts when the driving torque and the load torque are substantially equalized, and means automatically engaging said centrifugal clutch in said transmission to effect a direct drive between said shafts without slippage, when the rotation of said driven shaft attains a predetermined speed.

15. In a power transmission, a driving shaft, a driven shaft, means for transmitting power from said driving shaft to said driven shaft, including a planetary gear assembly a ring gear forming a part of said gear assembly, a second planetary gear assembly having a sun gear connected with said ring gear for rotation therewith, a ring gear forming a part of said second gear assembly, and means shiftable from connection with one to the other one of said gear assemblies for selectively holding either one of said ring gears against rotation in one direction, thereby effecting transmission in one or the opposite direction, said last mentioned means being operable to release one or both of said ring gears for rotation in either direction.

16. A mechanism according to claim 2, wherein the means for selectively holding the outer clutch member or the second ring gear against rotation comprises an annular row of teeth on said outer clutch member, an annular row of teeth on the rotatable housing, an annular rack intermediate said rows of teeth, and means for moving said rack into selective engagement with one of said rows of teeth.

17. A mechanism according to claim 2, wherein the means for selectively holding the outer clutch member or the second ring gear against rotation comprises an annular row of teeth on the outer clutch member, an annular row of teeth on the rotatable housing, an annular rack therebetween, brake means carried by said rack, and means for moving said rack into selective engagement with one of said rows of teeth coincidently with a corresponding engagement between said brake means and said clutch member or housing.

18. A mechanism according to claim 2, wherein the means for selectively holding the outer clutch member or the second ring gear against rotation includes a stationary housing for said means and comprises engageable means on the outer clutch member, engageable means on the rotatable housing, coacting engageable means intermediate said engageable means, latching means carried by said coacting engageable means, and means fixed to said stationary housing coacting with said latching means to selectively hold the same in one of a plurality of positions.

19. In a power transmission, a driving shaft, a driven shaft, means for transmitting power from said driving shaft to said driven shaft, including a planetary gear assembly for transmission in one direction a ring gear forming a part of said gear assembly, and an additional planetary gear assembly operatively connected with said first mentioned gear assembly for transmission in the opposite direction, having a sun gear connected with said ring gear for rotation therewith, a ring gear forming a part of said additional gear assembly, and means shiftable from connection with one to the other one of said gear assemblies for selectively holding either one of said ring gears against rotation in one direction, thereby causing the power transmission to take place in one or the opposite direction, said means being operable to release one or both of said ring gears for rotation in either direction.

20. In a power transmission, a driving shaft, a driven shaft, means for transmitting power from said driving shaft to said driven shaft, including a planetary gear assembly, a ring gear forming a part of said gear assembly, a clutch having two cooperating members, one of said clutch members being operatively connected with said ring gear, a second planetary gear assembly, including a sun gear coaxial with said ring gear and rotatable therewith, a ring gear forming a part of said second planetary gear assembly, means holding said first mentioned ring gear against rotation in one direction when the other one of said clutch members is held against rotation, and means shiftable from connection with one to the other one of said gear assemblies for selectively holding said second clutch member or said second ring gear against rotation, thereby effecting transmission in one or the opposite direction.

21. In a power transmission, a driving shaft, a driven shaft, means for transmitting power from said driving shaft to said driven shaft, including a liquid coupling and a reduction gear assembly, means automatically engaging said gear assembly for torque multiplying transmission therethrough when the driving torque is insufficient to overcome the load on said driven shaft and automatically establishing a direct drive through said liquid coupling when the driving torque and the load torque are substantially equalized, and a second reduction gear assembly for torque multiplying transmission therethrough operable when the transmission is reversed, and means shiftable from connection with one to the other one of said gear assemblies for effecting a torque multiplying power transmission in one or the opposite direction.

22. In a power transmission, a driving shaft, a driven shaft, means for transmitting power from said driving shaft to said driven shaft, including an over-running clutch having an outer cam shaped member, means for changing the transmission from one to the opposite direction of rotation, and means for holding said clutch member against rotation when so changing the transmission, said last mentioned means comprising a pendulous yoke embracing said clutch member, whereby said clutch member can rotate only when said yoke is free to oscillate, and means for controlling the oscillations of said yoke.

23. A mechanism according to claim 22, wherein the last mentioned means comprises a casing, partly filled with lubricating oil, said yoke being suspended from said casing for oscillation about one end, a cylinder in said casing, a piston linked to the free, opposite end of said yoke to reciprocate in said cylinder as said yoke oscillates, the interior of said cylinder communicating with the interior of said casing through a check valve permitting the oil to enter said cylinder, but not to escape therefrom, a second cylinder in said casing, a port in said first mentioned cylinder, ports in said last mentioned cylinder in registry therewith for passage of oil between said first mentioned cylinder and said casing through said second cylinder, a valve slidable in said second cylinder, and means linked to said slide valve for controlling its movement and the flow of oil through said ports.

24. In a power transmission, a driving shaft, a driven shaft, means for transmitting power from said driving shaft to said driven shaft, including a reduction gear assembly for transmission in one direction, an over-running clutch having a cam shaped outer member and an inner member operatively connected with one of the gears of said gear assembly, a second gear assembly for transmission in the opposite direction, means for changing the transmission from one to the opposite direction, and means for holding said cam shaped clutch member against rotation when so changing the transmission, said last mentioned means comprising a pendulous yoke embracing said outer clutch member, whereby said outer clutch member can rotate only when said yoke is free to oscillate, and means for controlling the oscillation of said yoke.

25. In a power transmission, a driving shaft, a driven shaft, means for transmitting power from said driving shaft to said driven shaft, including a reduction gear assembly for transmission in one direction, an over-running clutch having a cam shaped outer member and an inner member operatively associated with one of the gears of said gear assembly, an additional gear assembly operatively connected with said first mentioned gear assembly for transmission in the opposite direction, means for changing the transmission from a neutral position to one or the opposite direction of rotation, and means for holding said cam shaped clutch member against rotation when so changing the transmission, said last mentioned means comprising a pendulous yoke embracing said outer clutch member, whereby said clutch member can rotate only when said yoke is free to oscillate, and means operable from a remote point for controlling the oscillation of said yoke.

26. In a power transmission, a driving shaft, a driven shaft, means for transmitting power from said driving shaft to said driven shaft, including a planetary gear assembly for transmission in one direction, a ring gear forming a part of said gear assembly, an over-running clutch having a cam shaped outer member and an inner member secured to said ring gear for rotation therewith, an additional planetary gear assembly operatively connected with said first mentioned gear assembly for transmission in the opposite direction, means for changing the transmission from a neutral position to a forward or reverse direction, means for holding said outer clutch member against rotation when so changing the transmission, said last mentioned means comprising a pendulous yoke embracing said outer clutch member, whereby said outer clutch member can rotate only when said yoke is free to oscillate, and means operable from a remote point for controlling the oscillation of said yoke.

27. A mechanism according to claim 26, wherein the last mentioned means comprises a casing, partly filled with lubricating oil, said yoke being suspended from said casing for oscillation about one end, a cylinder in said casing, a piston linked to the free, opposite end of said yoke to reciprocate in said cylinder as said yoke oscillates, the interior of said cylinder communicating with the interior of said casing through a check valve permitting the oil to enter said cylinder but not to escape therefrom, a second cylinder in said casing, a port in said first mentioned cylinder, ports in said second cylinder in registry therewith, whereby oil may pass between said first mentioned cylinder and said casing through said second cylinder, a valve for controlling the flow of oil through said ports, a shaft at a remote point, a sleeve axially movable on said shaft, a manually operable lever for raising and lowering said sleeve, and means operatively connecting said control valve to said sleeve.

28. A mechanism according to claim 26, wherein the last mentioned means comprises a shaft, a sleeve axially movable on said shaft, a manually operable lever for raising and lowering said sleeve, a pump associated with the yoke, and means put in operation by the axial movement of said sleeve for actuating said pump.

29. In a power transmission, a driving shaft, a driven shaft, means for transmitting power from said driving shaft to said driven shaft, including a planetary gear assembly for power transmission in one direction of rotation, an additional planetary gear assembly operatively connected with said first mentioned gear assembly for transmission in the opposite direction, a ring gear forming a part of said first mentioned gear assembly, a ring gear forming a part of said additional gear assembly, an over-running clutch having an inner member secured to said first mentioned ring gear for rotation therewith, means for changing the transmission from a neutral position to one or the opposite direction of rotation, said changing means comprising an annular row of teeth on the outer surface of said clutch, an annular row of teeth fixedly connected with said second ring gear, an annular rack slidably mounted on said driven shaft between said rows of teeth, means preventing rotation of said rack, a rock shaft for moving said annular rack, and means operable at a remote point for actuating said rock shaft to selectively engage said rack with one of said annular rows of teeth.

30. In a power transmission, a driving shaft, a driven shaft, means for transmitting power from said driving shaft to said driven shaft, including a planetary gear assembly for transmission in one direction, a ring gear forming a part of said gear assembly, an additional planetary gear assembly operatively connected with said first mentioned gear assembly for transmission in the opposite direction, a ring gear forming a part of said second planetary gear assembly, an over-running clutch having an outer cam shaped member and an inner member secured to said first mentioned ring gear for rotation therewith, means for changing the transmission from a neutral position to one or the opposite direction of rotation, said changing means comprising an annular row of teeth on said outer clutch member, an annular row of teeth secured to said second ring gear, an annular rack slidably mounted on said driven shaft between said rows of teeth, a rock shaft for moving said rack, means for holding said outer clutch member against rotation when so shifting the transmission, said last mentioned means comprising a pendulous yoke embracing said outer clutch member, whereby said clutch member can rotate only when said yoke is free to oscillate, a shaft at a remote point, a sleeve rotatable and axially movable on said shaft, a manually operable lever for raising and lowering said sleeve and for rotating it, means actuated by the axial movement of said sleeve for controlling the oscillation of said yoke, and means actuated by the rotation of said sleeve for causing said rock shaft to selectively engage said rack with one of said rows of teeth.

31. In a motor vehicle power transmission, a driving shaft, a driven shaft, means for transmitting power from said driving shaft to said driven shaft, including a planetary gear assembly for transmission in one direction, a ring gear forming a part of said gear assembly, an additional planetary gear assembly operatively connected with said first mentioned gear assembly for transmission in the opposite direction, a ring gear forming a part of said additional gear assembly, an over-running clutch having a cam shaped outer member and an inner member secured to said first mentioned ring gear for rotation therewith, means for changing the transmission from one to the opposite direction of rotation, and means for causing said outer clutch member to become locked against rotation coincidently with the operation of said changing means.

32. A mechanism according to claim 31, wherein brake means are provided applicable to the outer clutch member and to the second ring gear during the shifting operation, in addition to the means locking the outer clutch member against rotation.

33. A mechanism according to claim 31, wherein the last mentioned means comprises a shaft within the steering column of the vehicle's steering wheel, a sleeve rotatable and axially movable on said shaft, a manually operable lever pivoted in said sleeve, guide means for said lever providing a fulcrum therefor to raise and lower said sleeve, said guide means being formed with recesses for selectively retaining said lever in one of a plurality of positions, means restoring said sleeve to its normal position, a pendulous yoke embracing said cam shaped outer clutch member, whereby said clutch member can rotate only when said yoke is free to oscillate, and means for blocking the oscillation of said yoke actuated by the downward movement of said sleeve when said lever is lifted in moving it from one of said recesses to another.

34. In a motor vehicle power transmission, including an over-running clutch having an outer cam shaped member, means for changing the transmission from one to the opposite direction, and a mechanism for holding parts of said transmission stationary coincidently with the operation of said shifting means and releasing said parts upon completion of said changing operation, said last mentioned means comprising a shaft within the steering column of the vehicle's steering wheel, a sleeve rotatable and axially movable on said shaft, a lever pivotally connected with said sleeve, guide means for said lever providing a fulcrum therefor to raise and lower said sleeve, said guide means being formed with recesses for selectively retaining said lever in one of a plurality of positions, a pendulous yoke embracing said cam shaped outer clutch member, whereby said clutch member can rotate only when said yoke is free to oscillate, and means blocking the oscillation of said yoke actuated by the downward movement of said sleeve when said lever is lifted in moving it from one of said recesses to another and releasing said yoke for oscillation when said lever is lowered into said other recess.

ALBERT D. PENTZ.